Aug. 10, 1954   B. G. SCHLUETER   2,685,913
TRACTOR SEAT CONSTRUCTION
Filed May 31, 1952   2 Sheets-Sheet 1

INVENTOR.
BRUNE G. SCHLUETER
BY Clarence E. Threedy
HIS ATTORNEY.

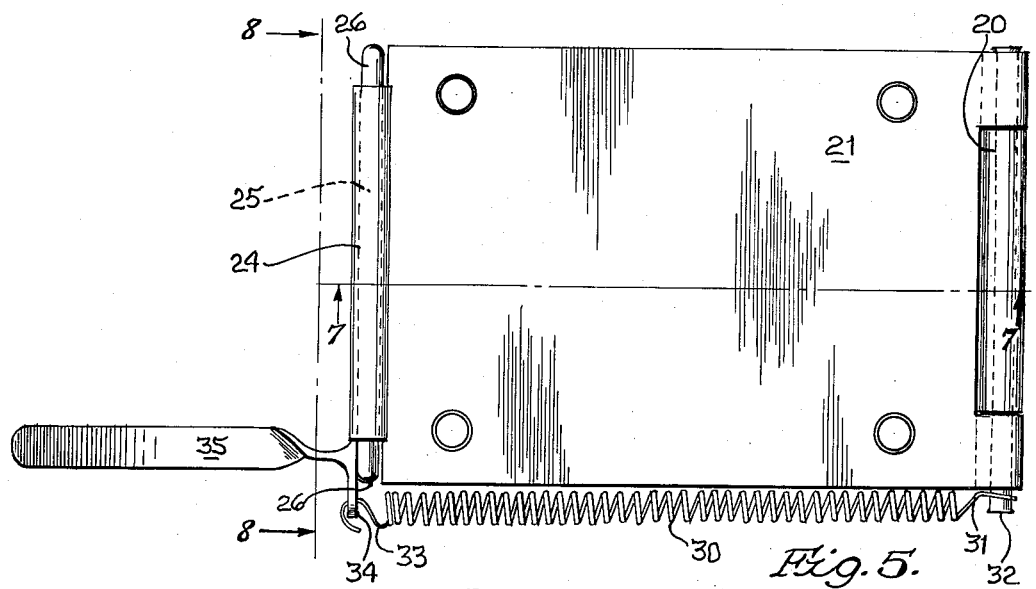

Patented Aug. 10, 1954

2,685,913

UNITED STATES PATENT OFFICE 2,685,913

TRACTOR SEAT CONSTRUCTION

Brune G. Schlueter, Ogden, Ill.

Application May 31, 1952, Serial No. 290,985

2 Claims. (Cl. 155—51)

My invention relates to certain new and useful improvements in tractor seat constructions and has for its principal object the provision of an improved construction of this character which will be highly efficient in use and economical in manufacture.

An important object of my invention is to provide a tractor seat construction wherein the seat may be securely latched in seating position and yet quickly and conveniently unlatched to permit the seat proper of the tractor to be pivoted to a position out of the way of the operator, so that he may assume a standing position, if desired, while manipulating the tractor.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 5 is a plan view of the seat hinge and latch therefor, showing the same separate and apart from the tractor seat and seat supporting post or standard;

Fig. 6 is an edge view of the same;

Fig. 7 is a sectional detail view taken substantially on line 7—7 of Fig. 5;

Fig. 8 is an edge detail view taken substantially on line 8—8 of Fig. 5.

Figure 1:
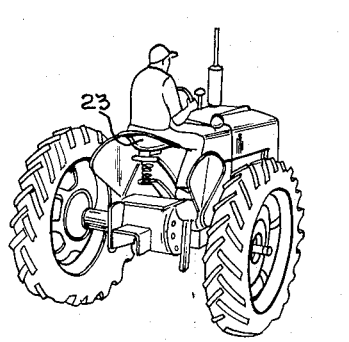
Fig. 1 is a perspective view of a tractor showing my invention associated therewith and with the tractor seat in seating position.

As will be apparent from the description to follow, my improved tractor seat construction may be adaptable for use with any standard and approved construction of tractor in which there is a seat post or standard 10 connected as at 11 to the chassis or frame 12 of the tractor. To the upper end portion 13 of this post 10 is attached in any suitable manner, an attaching member 14 providing a disc 15. Positioned between this disc 15 and the arm 16, is a spring 17 which cooperates with a shock absorber 18 to yieldably maintain the seat post 10 in a proper seating position. Attached to and supported by the member 14 at the upper end 13 of the post 10 is a relatively flat plate 19. One edge of this plate 19 is hingedly connected as at 20 to a companion plate 21. This plate 21 in turn is connected as at 22 to a seat 23 of a standard form of construction.

Figure 3:
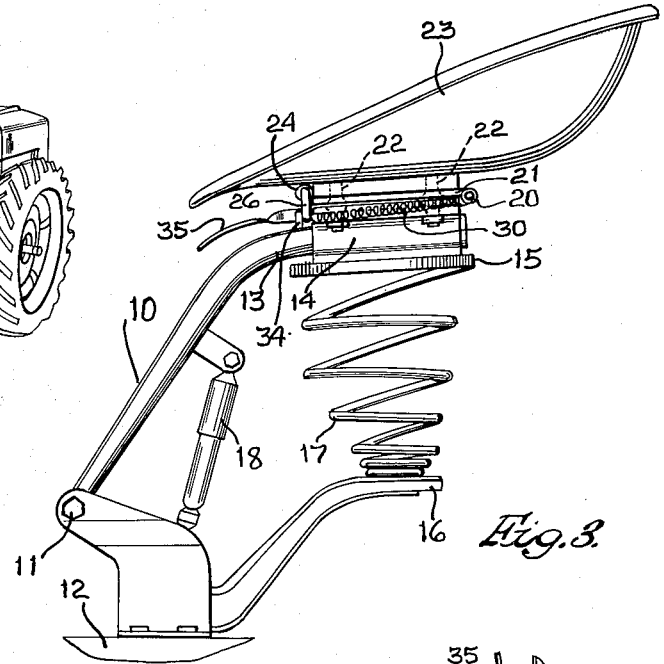
Fig. 3 is a side elevational view of the invention.

Opposite the hinge connection 20, the plate 21 provides a bearing sleeve 24 in which is journalled the intermediate portion 25 of a latch comprising inturned end portions 26 providing latch fingers 27 which are adapted to have latched engagement beneath the adjacent edge 28 of the plate 19, to latch the plate 21 to the plate 19 when the seat 23 is in the position shown in Fig. 3.

To facilitate automatic movement of these latch fingers 27 into latched position, the forward edge of the plate 19 is beveled as at 29. This beveled edge 29 will cam the fingers 27 outwardly so as to permit them to be drawn beneath the edge 28 by a spring 30. This spring 30 has one end portion 31 connected to the pintle 32 of the hinge connection 20. The opposite end portion is connected as at 33 to a lateral lug 34 formed as an integral part of a handle 35. This handle 35 is integral with the latch bar 25 and is preferably curved outwardly and downwardly to conform to the curvature of the upper end portion 13 of the post 10.

Figure 2:
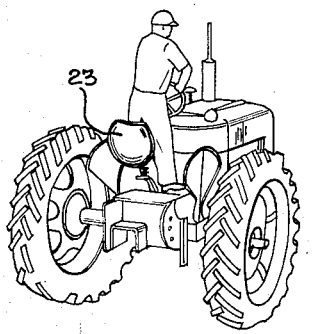
Fig. 2 is a view similar to Fig. 1, but showing the seat raised away from seating position.
Figure 4:
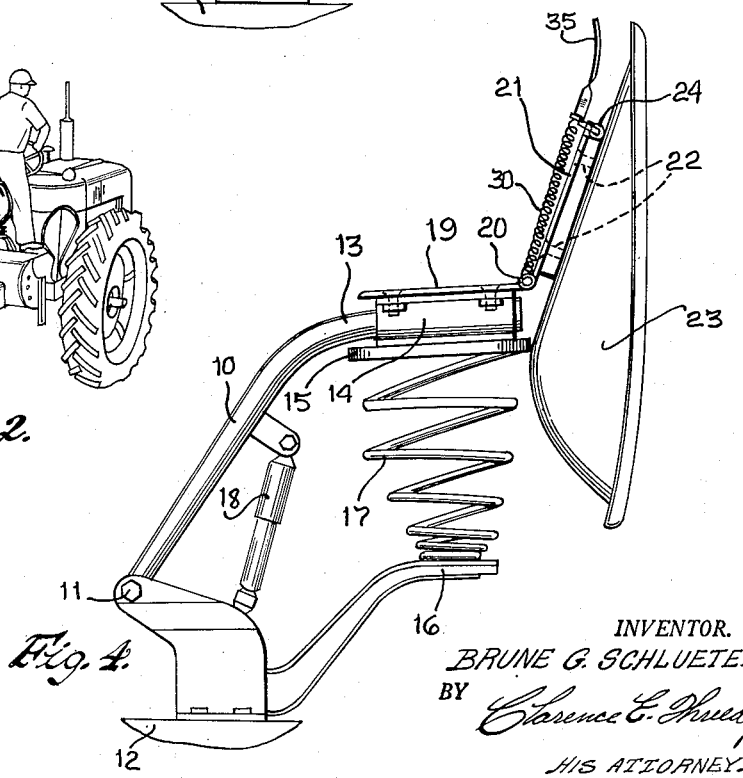
Fig. 4 is a side view similar to Fig. 3, but showing the seat raised away from seating position.

In the normal operation of the tractor, the seat 23 is disposed in the position shown in Fig. 3. However, for relaxation purposes, it is desirable that the operator from time to time temporarily assume a standing position while operating the tractor. To accomplish this, he rises to the position shown in Fig. 2, by straddling the seat post in an upright standing position, with the tractor seat pivoted to the position shown in Fig. 4. This is accomplished by simply grasping the handle 35 and pivoting the latch fingers 27 from engagement with the plate 19, and by means of such handle, pivoting the seat to the position shown in Fig. 4.

When it is desired to return the seat 23 to seating position, the operator simply tilts the seat to a position where it will fall by gravity to the position shown in Fig. 3. In thus falling, the latch fingers 27 will engage the beveled edge 29 of the plate 19 and be cammed thereby into latched engagement with such edge with the cooperation of the spring 30.

From the foregoing description, it is apparent that I have provided a tractor seat construction which may conveniently and with the minimum degree of labor be disposed in a position where the operator may assume a standing position while operating the tractor.

By reason of the simplicity of construction, my improved tractor seat may be adapted for use on any standard type tractor.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A tractor seat construction comprising a seat support including top and bottom plates hinged together along one corresponding edge portion and normally disposed in flat confronting horizontal relation, a seat member carried by the top plate, a hollow bearing carried by the top plate along its edge opposite said hinged connection, a pivotal latch member journaled in and extending beyond the ends of said bearing and having at its extremities thereof movable latch fingers adapted to engage beneath the adjacent edge of the bottom plate to latch said plates in their normal confronting relation, said edge of said bottom plate opposite said hinged connection being beveled to cam said latch fingers in a position for latched engagement with said corresponding edge of said bottom plate when said top plate is pivoted into its normal horizontal position with respect to said bottom plate, a handle carried by one of said latch fingers for moving said latch fingers from latched engagement with said bottom plate and for pivoting said top plate and said seat member carried thereby about said hinge connection; and a spring means having one end connected to said hinge connection and the opposite end connected to one of said latch fingers for urging said latch fingers into latched engagement with said edge of said bottom plate.

2. A tractor seat construction comprising a seat support including top and bottom plates hinged together along one corresponding edge portion and normally disposed in flat confronting horizontal relation, a seat member carried by the top plate, a hollow bearing carried by the top plate along its edge opposite said hinged connection, a latch member journaled in said bearing and pivotable along its long axis thereof and having at its extremities movable latch fingers to engage beneath the adjacent edge of the bottom plate to latch said plates in their normal confronting relation, said edge of said bottom plate opposite said hinged connection being beveled to cam said latch fingers in a position for latched engagement with said corresponding edge of said bottom plate when said top plate is pivoted into its normal horizontal position with respect to said bottom plate, a handle carried by one of said latch fingers for moving said latch fingers from latched engagement with said bottom plate and for pivoting said top plate and said seat carried thereby about said hinge connection, and a spring means having one end connected to said hinge connection and the opposite end connected to one of said latch fingers for urging said latch fingers into latched engagement with said edge of said bottom plate.

References Cited in the file of this patent

UNITED STATES PATENTS

| Number | Name | Date |
| --- | --- | --- |
| 2,534,386 | Stewart | Dec. 19, 1950 |
| 2,604,927 | Bonnesen | July 29, 1952 |